United States Patent [19]
Usui

[11] Patent Number: 5,719,755
[45] Date of Patent: Feb. 17, 1998

[54] DC TO DC CONVERTER

[75] Inventor: Hiroshi Usui, Sakado, Japan

[73] Assignee: Sanken Electric Co., Ltd., Niiza, Japan

[21] Appl. No.: 760,063

[22] Filed: Dec. 4, 1996

[30] Foreign Application Priority Data

Dec. 11, 1995 [JP] Japan .................. 7-345996

[51] Int. Cl.$^6$ .................. H02M 3/335
[52] U.S. Cl. .................. 363/19
[58] Field of Search .................. 363/16–19, 18–21, 363/95–97, 131–134, 89, 127

[56] References Cited

U.S. PATENT DOCUMENTS

| | | | |
|---|---|---|---|
| 4,758,937 | 7/1988 | Usui et al. | 363/19 |
| 4,958,268 | 9/1990 | Nagagata et al. | 363/16 |
| 5,636,108 | 6/1997 | Taurand | 363/2 |

FOREIGN PATENT DOCUMENTS 2-261053 of 0000 Japan.

*Primary Examiner*—Aditya Krishnan
*Attorney, Agent, or Firm*—Woodcock Washburn Kurtz Mackiewicz & Norris LLP

[57] ABSTRACT

A transformer has a primary winding connected across a dc power supply via a first switch such as a field effect transistor, and a secondary winding connected to a smoothing capacitor via a rectifying diode. Another field effect transistor or like second switch is connected in parallel with the rectifying diode. The voltage of the rectifying diode, detected by a serial circuit of a resistor and a reverse blocking diode, is compared with a reference voltage, and the second switch is made conductive when the diode voltage is less than the reference voltage.

18 Claims, 12 Drawing Sheets

5,719,755

DC TO DC CONVERTER

BACKGROUND OF THE INVENTION

This invention relates to converters commonly known as dc to dc converters or switching regulators which function to convert one direct current voltage into another preparatory to delivery to a load.

U.S. Pat. No. 4,758,937 to Usui et al. is considered typical of known switching regulators of the class under consideration. It comprises a direct current power supply, a transformer having three windings, a switching element, a rectifying and smoothing circuit, and a control circuit. The switching element is connected across the power supply via the primary winding of the transformer and turned on and off by the control circuit. The rectifying and smoothing circuit according to Usui et al. comprises a rectifying diode connected to the transformer secondary so as to be forwardly biased by the voltage induced in the secondary during the conducting periods of the switching element, a choke connected to the output side of the rectifying diode, a smoothing capacitor connected to the output side of the choke, and a diode forming a closed circuit with the choke and the capacitor.

It has also been known to comprise the rectifying and smoothing circuit of a rectifying diode connected to the transformer secondary so as to be reversely biased by the voltage induced in the transformer secondary during the conducting periods of the switching element and forwardly biased by the voltage induced in the transformer secondary during the nonconducting periods of the switching element, and a capacitor for smoothing the output voltage of the rectifying diode.

The switching regulators having this alternative rectifying and smoothing circuit are sometimes referred to as the flyback or reverse type, in contrast to the forward switching regulator proposed by Usui et al. The present invention belongs to the flyback category.

There have been strong, consistent consumer demands for more and more efficient dc to dc converters. Most effective, unfailing methods of improving the efficiency of the converters of the kind under consideration are to cut power losses due to the switching element and the rectifying diode. It has been suggested, for the reduction of power loss due to the rectifying diode, to connect a semiconductor switch such as a field effect transistor or a bipolar transistor in parallel with the diode and to cause conduction through the switch in synchronism with that of the diode. The parallel circuit of the diode and the switch offers a total resistance that is less than that of the diode only, thereby affording less power loss. This advantage is offset, however, by the complex circuitry required for causing conduction through the semiconductor switch on the transformer secondary side in step with the nonconduction of the switching element on the transformer primary side.

Another familiar method of converter efficiency improvement calls for the connection of a capacitor in parallel with the switching element on the transformer primary side with a view to the curtailment of power loss due to that switching element and to suppress voltage surges when the switching element is turned off. The capacitor will be charged during the nonconducting periods of the switching element, causing a proportionate rise in the voltage on the capacitor and the switching element. An electric current will flow through the switching element, whether it is a bipolar or a field effect transistor, even after it has been turned off, owing to semiconductor carrier storage. But the provision of the capacitor serves to prevent a rapid rise in the switching element voltage when it is turned off, resulting in the reduction of switching loss, that is, power loss due to the product of the current and voltage of the switching element, as well as in the suppression of voltage surges when the switching element is turned off.

However, the connection of a capacitor in parallel with the switching element has the weakness that power loss occurs as the capacitor is discharged via the switching element when it is turned on. A remedy to this weakness is found in Nagagata et al. U.S. Pat. No. 4,958,268. It suggests an inductance capacitance resonant circuit composed of the inductance of the transformer primary and the capacitor connected in parallel with the switching element. The resonance circuit is intended to provide a resonant waveform of the sinusoidal wave for reducing the voltage of the switching element about the time it is turned on. The switching loss decreases as the switching element is turned on when its voltage is zero or nearly so.

The voltage of the switching element when it is off depends upon the supply voltage of the converter and the flyback voltage of the transformer primary. Consequently, the switching element voltage will rise in proportion with the supply voltage, making it impossible in some cases to reduce the switching element voltage to zero by the resonant voltage.

For the solution of this problem Nagagata et al., supra, connects a second switching element in parallel with the rectifying diode connected to the transformer secondary. This second switching element is inverse in operation to the first on the transformer primary side, with the second becoming conductive when the first is nonconductive, and vice versa. In the flyback converters under consideration the rectifying diode goes off when the transformer completes energy release during a nonconducting period of the first switching element. According to Nagagata et al., however, the second switching element remains on after the rectifying diode goes off, so that a voltage is impressed from the smoothing capacitor to the transformer secondary via the second switching element. Since energy is thus supplied from smoothing capacitor to transformer primary, the resonant voltage on the transformer primary side can be made greater in amplitude. The resonant voltage of greater amplitude can reduce the first switching element voltage to zero, provided that the converter input voltage does not fluctuate.

For its advantages set forth above, however, the Nagagata et al. converter has its own drawbacks. First, it demands complex circuitry for inversely operating the two switching elements on both sides of the transformer. Second, the first switching element voltage does not necessarily fall to zero in the event of fluctuations in the converter input voltage.

SUMMARY OF THE INVENTION

The present invention has it as an object to make materially simpler in configuration the dc to dc converters of the type having two switching elements on both sides of a transformer or equivalent inductance means.

Another object of the invention is to reduce the power losses of dc to dc converters to an absolute minimum in the face of fluctuations in the input voltage.

Briefly, the present invention may be summarized as a dc to dc converter comprising a first switching element connected across a source of direct current voltage, the first switching element having a control terminal connected to first switch control means thereby to be turned on and off. An inductance means is connected in series with the first switching element for storing energy from the voltage source during conduction of the first switching element and for releasing the stored energy during nonconduction of the first switching element. A rectifying diode is connected to the inductance means so as to be reversely biased by a voltage from the inductance means during conduction of the first switching element and forwardly biased by a voltage from the inductance means during nonconduction of the first switching element. A smoothing capacitor is also connected to the inductance means via the rectifying diode for smoothing a voltage that has been rectified by the rectifying diode, for supply to a load. Connected in parallel with the rectifying diode is a second switching element which has a control terminal connected to second switch control means thereby to be turned on and off. The second switch control means comprises diode voltage detecting means connected to the rectifying diode for detecting the voltage thereof, reference voltage means for providing a reference voltage, and comparison means connected to the diode voltage detecting means and the reference voltage means and to the control terminal of the second switching element for comparing the voltage of the rectifying diode and for causing conduction through the second switching element when the voltage of the rectifying diode is less than the reference voltage.

Particular attention should be paid to the second switching element which is effective to reduce both voltage drop and power loss due to the rectifying diode. The second switching element is controlled according to the invention by detecting the voltage of the rectifying diode, resulting in drastic simplification of the second switch control means.

Another feature of the invention resides in a resonant capacitor which is connected in parallel with the first switching element. The resonant capacitor coacts with the inductance means for resonance such that switching loss is minimized not only when the first switching element is turned off but when it is turned on, too.

Still another feature of the invention resides in means for adjustably varying the reference voltage used in the second switch control means. The adjustably varying means assures positive reduction of switching loss in the face of variations in supply voltage.

The above and other features and advantages of this invention and the manner of realizing them will become more apparent, and the invention itself will best be understood, from a study of the following description and appended claims, with reference had to the attached drawings showing some preferable embodiments of the present invention.

DESCRIPTION OF THE PREFERRED EMBODIMENTS

Figure 1:
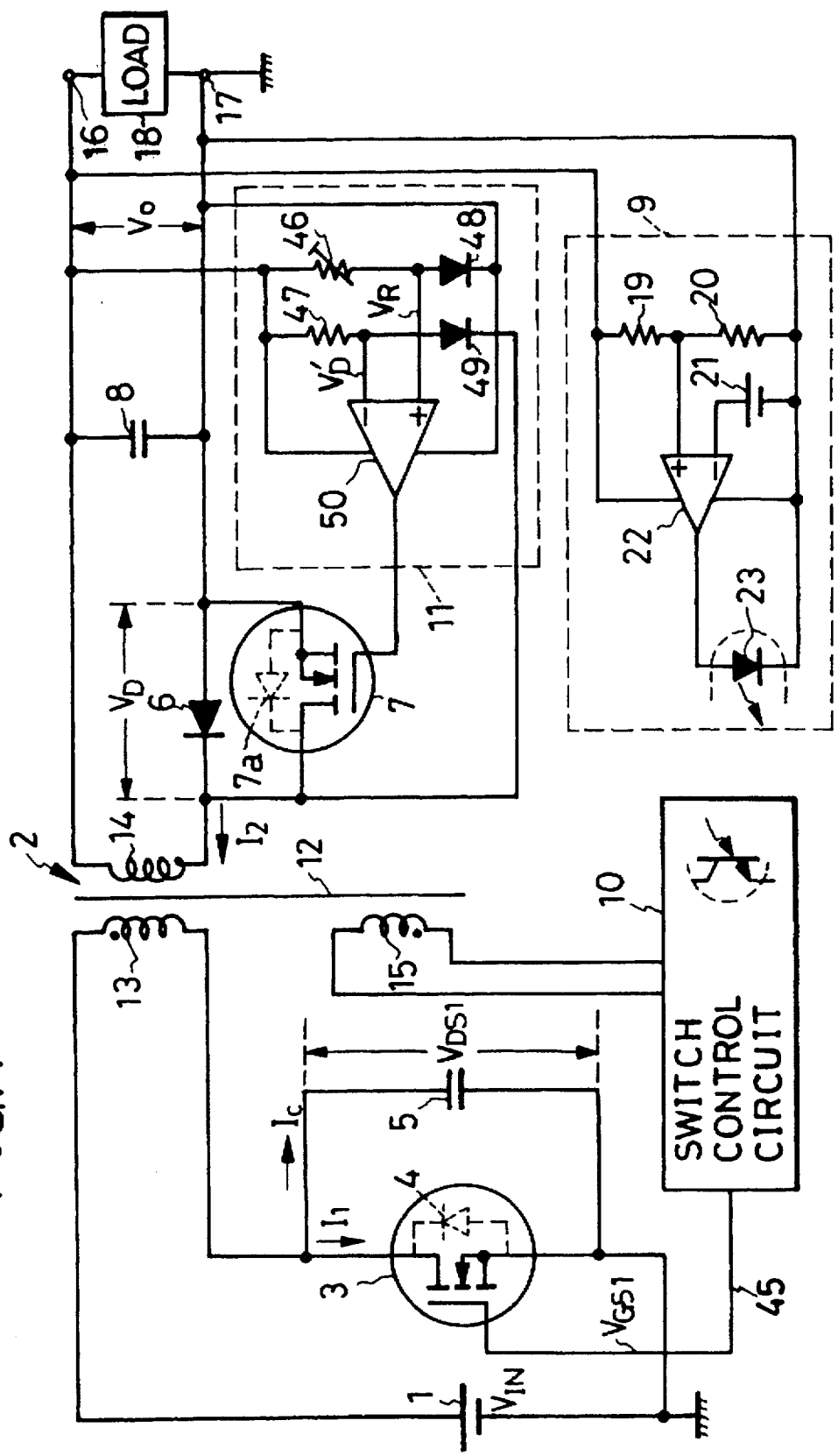
FIG. 1 is a schematic electrical diagram of a first preferred form of dc to dc converter constructed according to the novel concepts of the present invention.

The present invention will now be described in detail in terms of the dc to dc converter of the flyback variety illustrated in FIG. 1 by way of a representative embodiment of the invention. Broadly, the representative converter comprises a dc power supply 1, a transformer 2, a first switching element shown as an N channel metal oxide semiconductor field effect transistor (MOSFET or, more simply, FET) 3, known also as insulated gate field effect transistor, with a built in diode 4, a resonant capacitor 5, a rectifying diode 6, a second switching element shown as another FET 7 with an inbuilt diode 7a, a smoothing capacitor 8, a voltage detector circuit 9, and a first 10 and a second 11 switch control circuit.

The dc power supply 1 may take the form of either a battery or a combination of a rectifier circuit connected to a commercial ac power supply, and a smoothing capacitor to the rectifier circuit. Either way, the voltage input to the converter is unstabilized.

The transformer 2 has a magnetic core 12 around which there are coiled a primary winding 13, a secondary winding 14 and a tertiary winding 15. As indicated by the dots in FIG. 1, the polarities of the transformer windings upon voltage application are such that when the top extremity, as seen in this figure, of the primary 13 is positive, for example, so is the bottom extremity of the secondary 14. It is understood that the primary 13 has a leakage inductance that resonates with the resonant capacitor 5.

The FET 3 is connected in series with the transformer primary 13, with its drain connected to one terminal of the power supply 1 via the transformer primary, and its source directly to the other terminal of the power supply. Being of insulated gate construction, and having its source coupled to the semiconductor substrate, the FET 3 has an inbuilt diode 4 connected between drain and source. Alternatively, however, a separate rectifying diode could be provided in substitution for the inbuilt diode 4.

The resonant capacitor 5 is connected in parallel with the FET 3. Intended for switching loss reduction, this capacitor functions more specifically to cause a gradual rise in the voltage on the FET 3 when it is turned off, and to zero the FET voltage by resonance when it is turned on. The resonant capacitor 5 is therefore much less in capacitance than the smoothing capacitor, not shown, of the power supply 1 or the smoothing capacitor 8 on the transformer secondary side. This capacitor 5 could be omitted, however, as the stray capacitance between the drain and source of the FET 3 could be utilized for the same purposes.

On the transformer secondary side, the rectifying diode 6 is connected between transformer secondary 14 and smoothing capacitor 8. The polarity of the rectifying diode 6 is such that it is reversely biased by the voltage induced in the transformer secondary 14 when the FET 3 is on, and forwardly biased by the voltage induced in the transformer secondary when the FET is off.

Connected in parallel with the rectifying diode 6 is the second FET 7 of the same construction as the first FET 3. The smoothing capacitor 8 is connected in parallel with the transformer secondary 14 via the rectifying diode 6, and to a pair of output terminals 16 and 17 between which a load 18 is shown connected.

For making the converter output voltage constant, the output detector circuit 9 is connected between the pair of output terminals 16 and 17 or between the pair of opposite terminals of the smoothing capacitor 8. The output detector circuit 9 includes two resistors 19 and 20 connected in series between the pair of converter output terminals 16 and 17 for detection of the output voltage. The interconnection between these resistors 19 and 20 is connected to the positive input of a differential amplifier 22, the negative input of which is connected to a reference voltage source 21, and the supply inputs of which are connected to the converter output terminals 16 and 17, respectively. The output of the differential amplifier 22 is connected to a light emitting diode (LED) 23 and thence to the grounded converter output terminal 17. Thus the differential amplifier 22 puts out a voltage proportional to the difference between the voltage from between the resistors 19 and 20 and the reference voltage, and the LED 23 emits light with an intensity proportional to the magnitude of the differential amplifier output voltage.

The first switch control circuit 10 turns the first FET 3 on and off in response to the voltage induced in the transformer tertiary 15, and further controls the conducting period of the first FET in response to the optical output from the LED 23 so as to make constant the converter output voltage.

Figure 2:
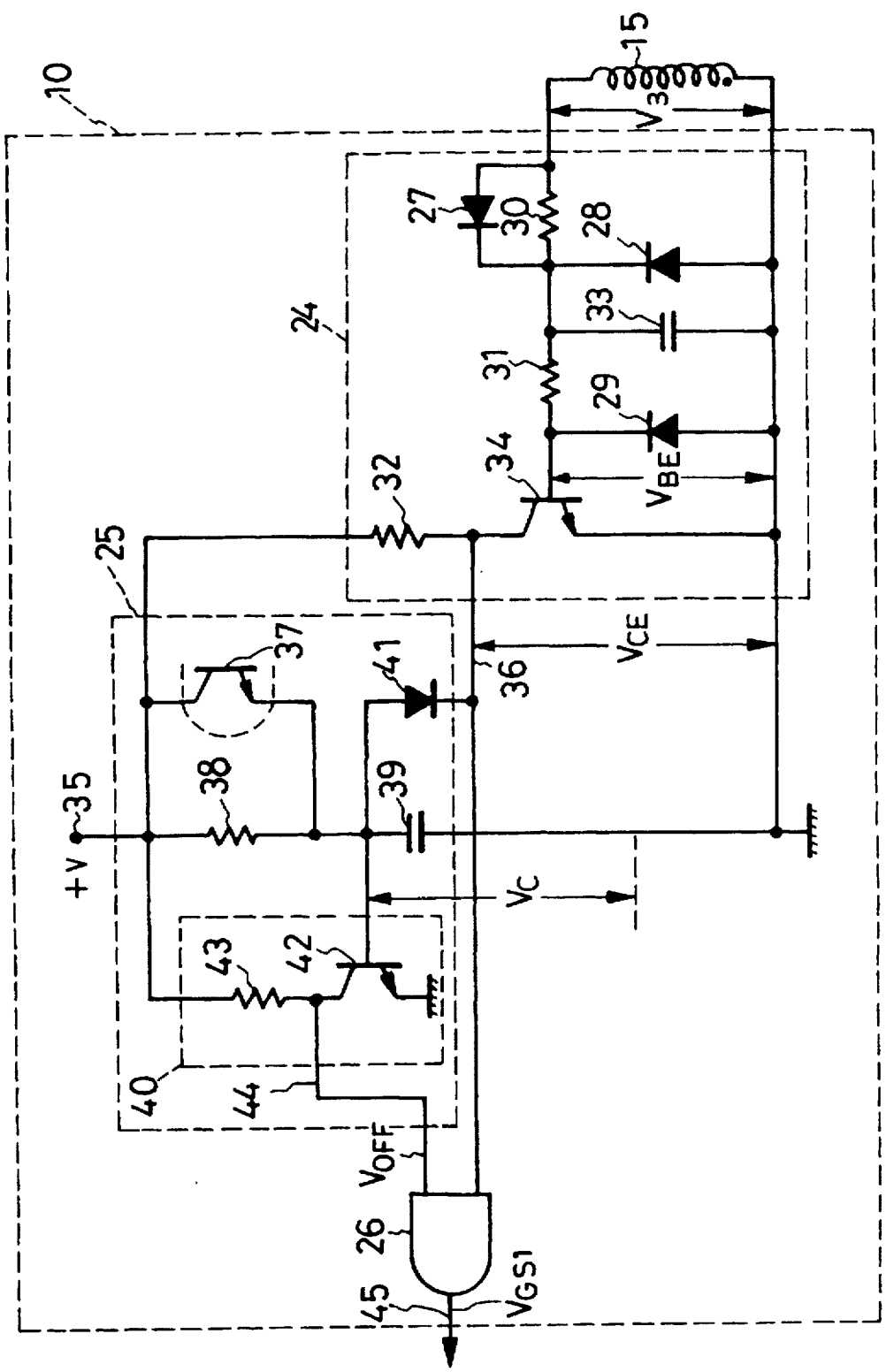
FIG. 2 is a schematic electrical diagram showing in detail the first switch control circuit of the FIG. 1 converter.

As illustrated in detail in FIG. 2, the first switch control circuit 10 may be more easily understood when divided into a first subcircuit 24, a second subcircuit 25 and an AND gate 26, the two subcircuits being both connected to the inputs of the AND gate. The first subcircuit 24 functions to ascertain a first moment when the transformer 2 completes the release of substantially all its energy that has been stored during the conducting period of the first FET 3, and a second moment which comes after the first moment by the period of time equivalent to half the cycle, or 180 degrees, of the voltage waveform due to the resonance of the resonant capacitor 5 and the inductance of the transformer primary 13.

More specifically, the first subcircuit 24 includes a diode 27 having its anode connected directly to one extremity of the transformer tertiary 15, and its cathode to the other extremity of the transformer tertiary via a capacitor 33. As a voltage is induced in one direction (upward as seen in FIG. 2) in this transformer tertiary with energy release from the transformer 2 during the nonconducting periods of the first FET 3, the diode 27 will become conductive thereby permitting the capacitor 33 to be charged.

A resistor 30 is connected in parallel with the diode 27, and a second diode 28 in parallel with the capacitor 33. Therefore, when a voltage is induced in the other direction in the transformer tertiary 15 during the conducting periods of the first FET 3, a current will flow through the circuit comprising the diode 28 and resistor 30. Clamped by the diode 28, the capacitor 33 will then have a very small voltage. The voltage on the capacitor 33 is therefore subject to change with energy stored on the transformer 2.

The capacitor 33 is connected between the base and emitter of a transistor 34 via a second resistor 31, so that this transistor will turn on and off in response to the voltage from the capacitor 33. Connected inversely between the base and emitter of the transistor 34, the diode 29 functions to protect the pn junction between the base and emitter of the transistor. The transistor 34 has its emitter grounded and its collector connected via a third resistor 32 to a unidirectional control voltage terminal 35, which is shown to be external to both subcircuits 24 and 25. The interconnection between third resistor 32 and transistor 34 is connected to one of the two inputs of the AND gate 26 by way of an output line 36 of the first subcircuit 24.

There is therefore obtained on the first subcircuit output line 36 a signal that is low when the transistor 34 is on, and high when the transistor is off. This output signal indicates, with a prescribed time delay, a period of time required for the release of all the stored energy by the transformer 2, which period is approximately equivalent to each nonconducting period of the FET 3. The delay due to the first subcircuit 24 is so determined as to cause zero volt switching of the first FET 3 by what may be termed pseudoresonance or partial resonance.

The second subcircuit 25 of the first switch control circuit 10 includes a phototransistor 37 which is optically coupled to the LED 23, FIG. 1, of the output detector circuit 9. The phototransistor 37 conducts to an extent determined by the intensity of the light emitted by the LED 23; in other words, the resistance offered by the phototransistor 37 varies in inverse proportion to the light intensity of the LED 23. Connected in parallel with the phototransistor 37, a resistor 38 is further connected on one hand to the control voltage terminal 35 and, on the other hand, grounded via a capacitor 39. Thus the capacitor 39 is charged with a current that depends upon the resistance of the phototransistor 37.

Also included in the second subcircuit 25 is a comparator circuit 40 comprising a transistor 42 and a resistor 43. The transistor 42 has a base connected to the capacitor 39, an emitter grounded, and a collector connected to the control voltage terminal 35 via the resistor 43. The interconnection between transistor 42 and resistor 43 is connected to the other input of the AND gate 26 via a second subcircuit output line 44.

The transistor 42 of the comparator circuit 40 will conduct when as its base emitter voltage $V_{BE}$ rises to its threshold voltage $V_{TH}$. Functionally, therefore, the transistor 42 constantly compares the voltage $V_C$ of the capacitor 39 and the threshold voltage $V_{TH}$ and provides a low output voltage on the line 44 when the capacitor voltage $V_C$ rises to the threshold voltage $V_{TH}$. The comparator circuit 40 is essentially like a NOT circuit having a threshold value. A diode 41 is so connected between the capacitor 39 and the first subcircuit output line 36 that when the line 36 goes low, a circuit is completed for the capacitor 39 to discharge, making the capacitor voltage practically zero.

Inputting the signals from both subcircuits 24 and 25, the AND gate 26 delivers switch control pulses to the gate of the first FET 3, FIG. 1, by way of a line 45.

Reference is now directed back to FIG. 1 for detailed description of the second switch control circuit Ii for controlling the second FET 7 on the transformer secondary side. The second switch control circuit 11 includes a resistor 46 and a diode 48 which are interconnected in series across the smoothing capacitor 8. The diode 48 is intended for use as resistor needed to provide a reference voltage $V_R$, so that it could be replaced by a resistor. The interconnection between resistor 46 and diode 48 is connected to the positive input of a comparator 50 in order to supply thereto the reference voltage $V_R$ obtained by dividing the unidirectional output voltage $V_O$ of the converter.

Connected in series with the rectifying diode 6, a resistor 47 and a diode 49 conjointly function as means for detecting the voltage of the diode 6. More exactly, a serial circuit of the rectifying diode 6 and the resistor 47 and the diode 49 is connected between the pair of converter output terminals 16 and 17. The diode 49 is connected between the cathode of the rectifying diode 6 and the resistor 47 in order to prevent reverse current flow through the resistor 47 when a voltage is induced downwardly in the transformer secondary 14. The interconnection between resistor 47 and diode 49 is connected to the negative input of the comparator 50. The output of the comparator 50 is connected to the gate of the second FET 7, and its supply terminals are connected to the converter output terminals 16 and 17.

The comparator 50 forms pulses for on off control of the second FET 7 by comparing the reference voltage $V_R$ and the rectifying diode voltage $V_D$. However, the comparator 50 does not directly input the rectifying diode voltage $V_D$ but does input the voltage $V_D'$ which is equal to the voltage $V_D$ plus the voltage drop due to the reverse blocking diode 49. The input voltage $V_D'$ can be considered essentially equivalent to the rectifying diode voltage $V_D$ since the voltage drop due to the reverse blocking diode 49 is practically constant.

Operation

Figure 3:
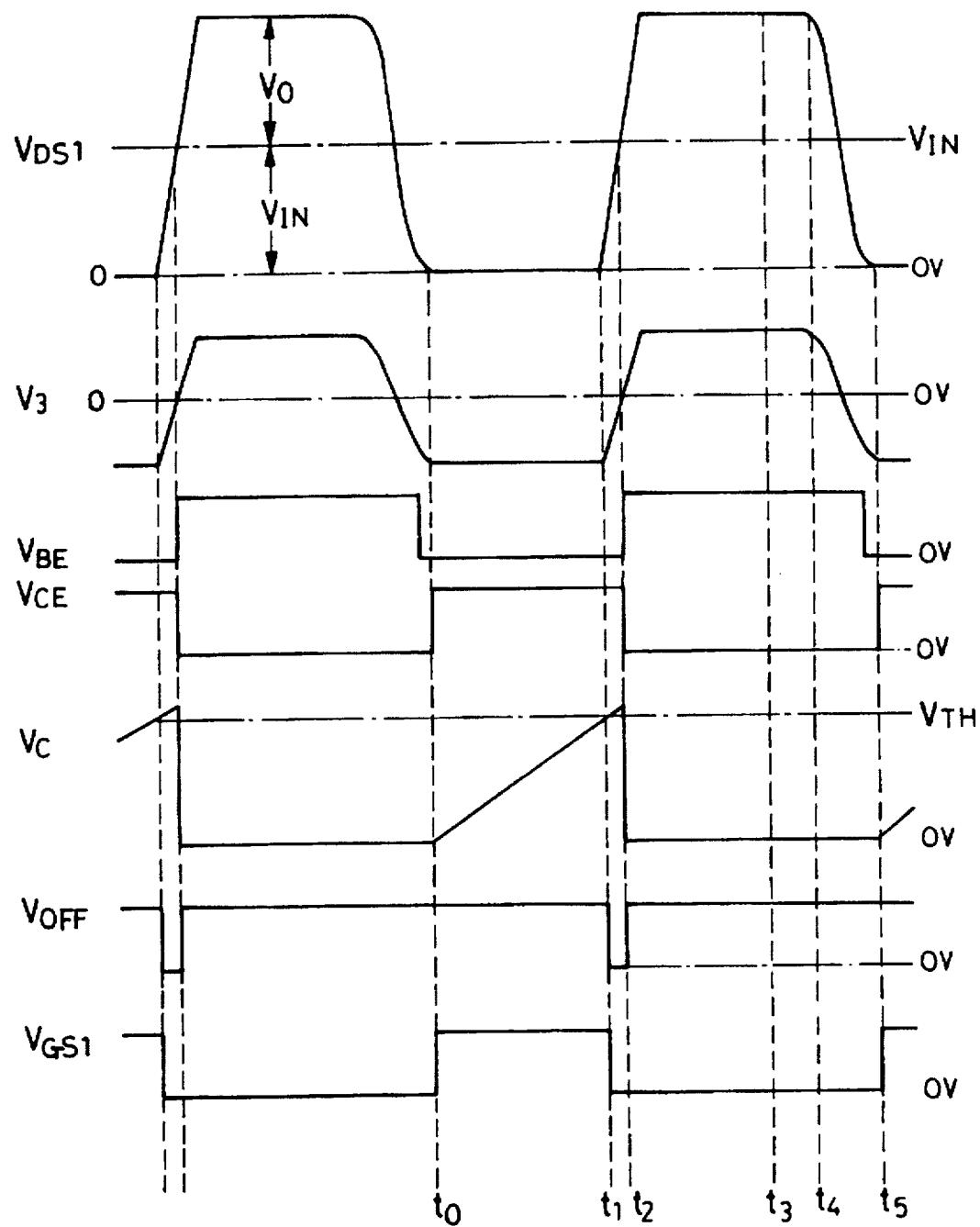
FIG. 3 is a diagram showing in proper time relationship the waveforms appearing in various parts of FIGS. 1 and 2.

The operation of the FIGS. 1 and 2 dc to dc converter will be best understood by referring to FIG. 3 which shows the waveforms appearing in various parts of FIGS. 1 and 2. The symbols shown in FIG. 3 are defined as follows:

$V_{DS1}$=drain-source voltage of the first FET 3
$V_t$=voltage of the transformer tertiary 15
$V_{BE}$=base-emitter voltage of the transistor 34 of the first subcircuit 24 of the first switch control circuit 10
$V_{CE}$=collector-emitter voltage of the transistor 34 of the first subcircuit 24
$V_C$=voltage of the capacitor 39 of the second subcircuit 25 of the first switch control circuit 10
$V_{OFF}$=output voltage of the second subcircuit 25
$V_{GS1}$=gate-source voltage of the first FET 3.

Reference may therefore be had to FIG. 3 whenever the foregoing symbols appear in the course of the following operational description. These symbols are given also in those parts of FIGS. 1 and 2 where the corresponding waveforms appear.

The first FET 3 will conduct at $t_0$ in FIG. 3 when the gate-source voltage $V_{GS1}$ from the first switch control circuit 10 goes high. The drain-source voltage $V_{DS1}$ of the first FET 3 will then become approximately zero. A voltage will be induced downwardly, as seen in FIG. 1, in the transformer secondary 14 during the ensuing conducting period $t_0$–$t_1$ of the first FET 3. No current will flow through the transformer secondary 14 as the rectifying diode 6 is reverse biased. Energy will therefore be stored in the transformer 2 during this conducting period of the first FET 3.

Also, during the conducting period $t_0$–$t_1$ of the first FET 3, a voltage will be induced downwardly in the transformer tertiary 15, resulting in the discharge of the capacitor 33, FIG. 2, of the first subcircuit 24 of the first switch control circuit 10. Then the capacitor 33 has its voltage clamped by the forward voltage of the diode 28, so that the base-emitter voltage $V_{BE}$ of the transistor 34 will become approximately zero whereas the collector-emitter voltage $V_{CE}$ of this transistor will go high. This high collector-emitter voltage $V_{CE}$ will be applied to the AND gate 26.

The other input voltage $V_{OFF}$ of the AND gate 26 will be high until the voltage of the capacitor 39, FIG. 2, of the second subcircuit 25 of the first switch control circuit 10 reaches the threshold value $V_{TH}$. Both inputs to the AND gate 25 will thus be high from $t_0$ to $t_1$. The resulting high output from the AND gate 26 will be applied over the line 45 to the first FET 3 as its gate-source voltage $V_{GS1}$.

Since the transistor 34 is connected in parallel with the capacitor 39 via the diode 41, the capacitor 39 will be discharged before $t_0$ when the transistor 34 is on, and its voltage $V_C$ will remain zero until $t_0$. However, when the transistor 34 becomes nonconductive at $t_0$, the diode 41 will become reverse biased to permit the capacitor 39 to be charged via the phototransistor 37 and resistor 38.

The resistance of the phototransistor 37 depends upon the intensity of the light emitted by the LED 23, FIG. 1, of the output voltage detector circuit 9. When the converter output voltage $V_O$ between the output terminals 16 and 17 rises above a desired value, the output light intensity of the LED 23 will increase correspondingly. With its resistance thus lowered, the phototransistor 37 will permit easier flow therethrough of the current charging the capacitor 39. The voltage $V_C$ of the capacitor 39 will then rise more quickly, demanding a shorter length of time to reach the threshold value $V_{TH}$. Conversely, the capacitor voltage $V_C$ will rise from zero to the threshold value $V_{TH}$ in a longer period of time in the event of a drop in the converter output voltage.

The transistor 42 will conduct when the capacitor voltage $V_C$ reaches the threshold value $V_{TH}$ at $t_1$, thereby making the AND gate input voltage $V_{OFF}$ low. Then the gate-source voltage $V_{GS1}$ of the first FET 3 will go low to cause nonconduction through this FET. Flyback voltages will be produced in the transformer windings 13, 14 and 15 when the first FET 3 goes off. The voltage generated in the transformer secondary 14 during the nonconducting period of the first FET 3 is so polarized that the rectifying diode 6 will be forwardly biased. The current $I_2$ due to the energy release of the transformer 2 will flow through the transformer secondary 14 and rectifying diode 6, charging the smoothing capacitor 8.

The second FET 7 will conduct approximately concurrently with the rectifying diode 6 connected in parallel therewith. The second FET 7 is so constructed as to permit current flow not only from source to drain but also the other way around, so that the current flows through both diode 6 and FET 7 during energy release from the transformer 2. The internal resistances of the diode 6 and FET 7 can be thought of as being essentially in parallel connection with each other when they are conducting at the same time. Less voltage drop and less power loss are thus assured compared with switching regulators having the rectifying diode 6 but no second FET. The second FET 7 performs the additional function of reversing part of the energy to the transformer primary side, as will be detailed subsequently.

The voltage of the smoothing capacitor 8 is impressed to the transformer secondary 14 during the conducting period of the rectifying diode 6, so that a voltage will be induced in the transformer primary 13 according to the ratio of the numbers of turns of these windings. Let this ratio be one for example. The voltage induced in the transformer primary 13 will then be equal to that of the capacitor 8. As indicated in FIG. 3, therefore, the voltage $V_{DS1}$ of the first FET 3 will be the sum of the supply voltage $V_{IN}$ and the output voltage $V_O$ during the nonconducting period of the first FET.

The resonant capacitor 5 connected in parallel with the first FET 3 contributes to the reduction of switching loss and the attenuation of voltage surges, as will be explained in more detail hereinbelow. The drain-source voltage $V_{DS1}$ of the first FET 3 rises not immediately but gradually to $V_{IN}+V_O$ when the first FET goes off as at $t_1$ in FIG. 3. This is because the resonant capacitor 5 is charged through the inductance of the transformer primary 13 when the first FET 3 goes off at $t_1$, causing a gradual rise in the drain-source voltage $V_{DS1}$.

This gradual increase in the drain-source voltage $V_{DS1}$ serves to reduce switching loss. For, in the first FET 3, the drain current will continue to flow under the effect of carrier storage after $t_1$ when the FET is turned off. The power loss due to the product of current and voltage would increase if the drain-source voltage $V_{DS1}$ of the first FET 3 were high when the drain current was flowing as above. In the illustrated dc to dc converter, however, the capacitor 5 functions as above to cause a gradual increase in the drain-source voltage $V_{VS1}$ of the first FET 3. Power loss lessens as the product of current and voltage of the first FET 3 becomes less. The capacitor 5 serves the additional purpose of suppressing noise arising when the first FET 3 is turned off.

A voltage is also induced upwardly, as seen in FIGS. 1 and 2, in the transformer tertiary 15 during the nonconducting period of the first FET 3 as the voltage $V_O$ of the smoothing capacitor 8 is impressed to the transformer secondary 14. This transformer tertiary voltage $V_s$ rises above zero, as after $t_2$ in FIG. 3, the diode 27, FIG. 2, of the first switch control circuit 10 will be forwardly biased and so conduct to permit the capacitor 33 to be charged. Thus the base-emitter voltage $V_{BE}$ of the transistor 34 will be high from $t_2$ to shortly before $t_5$. The transistor 34 will therefore be conductive from $t_2$ to $t_5$, holding the collector-emitter voltage $V_{CE}$ low. Upon conduction of the transistor 34 at $t_2$ the diode 41 will conduct, too, with the consequent completion of the discharge circuit for the capacitor 39. The voltage $V_C$ of the capacitor 39 will become zero approximately at $t_2$ so that the AND gate 26, FIG. 2, will remain zero after $t_2$, as from $t_1$ to $t_2$, holding the first FET 3 off.

All the stored energy of the transformer 2 will be released at $t_3$. Should the second FET 7 be turned off at $t_3$, the voltage $V_O$ of the smoothing capacitor 8 would not be impressed to the transformer secondary 14, allowing the drain-source voltage $V_{DS1}$ of the first FET 3 to drop. FIG. 3 indicates that no such drop of the voltage $V_{DS1}$ occurs at $t_3$, because the second FET 7 is held conductive until $t_4$ shortly after $t_3$. Consequently, the voltage $V_O$ of the capacitor 8 will be impressed to the transformer secondary 14 via the second FET 7 even after the rectifying diode 6 becomes nonconductive upon completion of energy release from the transformer 2 at $t_3$, so that the drain source voltage $V_{DS1}$ of the first FET 3 will be held at $V_{IN}+V_O$ until $t_4$.

With the second FET 7 held conductive as above after $t_3$, energy will be stored in the transformer 2 from the capacitor 8 in the opposite direction to that during the conduction of the first FET 3; in other words, the energy on the smoothing capacitor 8 will be reversed toward the power supply 1, instead of being supplied to the load 18.

Such energy reversal will terminate at $t_4$ when the second FET 7 is turned off. A voltage will then be induced upwardly, as seen in FIG. 1, in the transformer primary 13 with the release of the energy that has been stored in the transformer 2 during the energy reversal. Energized by this voltage, LC resonance will occur by virtue of the inductance of the transformer primary 14 and the capacitance of the resonant capacitor 5. As a resonant current will flow through the closed circuit comprising the transformer primary 13, power supply 1 and resonant capacitor 5, the voltage of this resonant capacitor, or the drain-source voltage $V_{DS1}$ of the first FET 3, will vary as from $t_4$ to $t_5$ in FIG. 3, depicting a waveform equivalent to 180 degrees from 90 to 270 degrees of a sinusoidal wave.

The amplitude and frequency of the resonant waveform are determined by the inductance of the transformer primary 13, the capacitance of the first capacitor 5, and the energy reversed to the transformer 2. All these constants can be known if the supply voltage is constant, so that the maximum potential difference of the resonant waveform can be set at the maximum amplitude $V_{IN}+V_O$ of the drain-source voltage $V_{DS1}$ of the first FET 3, and the first FET can be made to turn on at $t_5$ in FIG. 3.

It is by the first subcircuit 24, in particular, of the first switch control circuit 10 that the first FET 3 is turned on at $t_5$ when its drain-source voltage $V_{DS1}$ becomes substantially zero. The voltage $V_5$ of the transformer tertiary 15, which varies in a manner similar to the drain-source voltage $V_{DS1}$, starts dropping at $t_4$ and goes negative at some time between $t_4$ and $t_5$. The voltage of the capacitor 33 also drops with the tertiary voltage $V_3$. However, since the discharge path of the capacitor 33 includes the resistors 30 and 31, the capacitor voltage drops with some delay, and the base-emitter voltage $V_{BE}$ of the transistor 34 becomes zero shortly after $t_4$. The collector-emitter voltage $V_{CE}$ of the transistor 34 does not immediately go high when its base-emitter voltage $V_{BE}$ becomes zero, but shortly thereafter, at $t_5$, because of the carrier storage effect of the transistor.

The first FET 3 is switched on at $t_5$. The desired delay can thus be obtained both by the delayed action of the capacitor 33 in the first subcircuit 24 of the first switch control circuit 10 and by the carrier storage effect of the transistor 34 of the same subcircuit 24. That is to say that the gate-source voltage $V_{GS1}$ of the first FET 3 can be made to go high at $t_5$ when its drain-source voltage $V_{DS1}$ drops to zero.

With the first FET 3 made conductive at $t_5$ as above, the product of the voltage and current of this FET will become zero or close to zero, resulting in the reduction of power loss. This is because the first FET 3 becomes conductive after the capacitor 5 has been practically thoroughly discharged.

Figure 4:
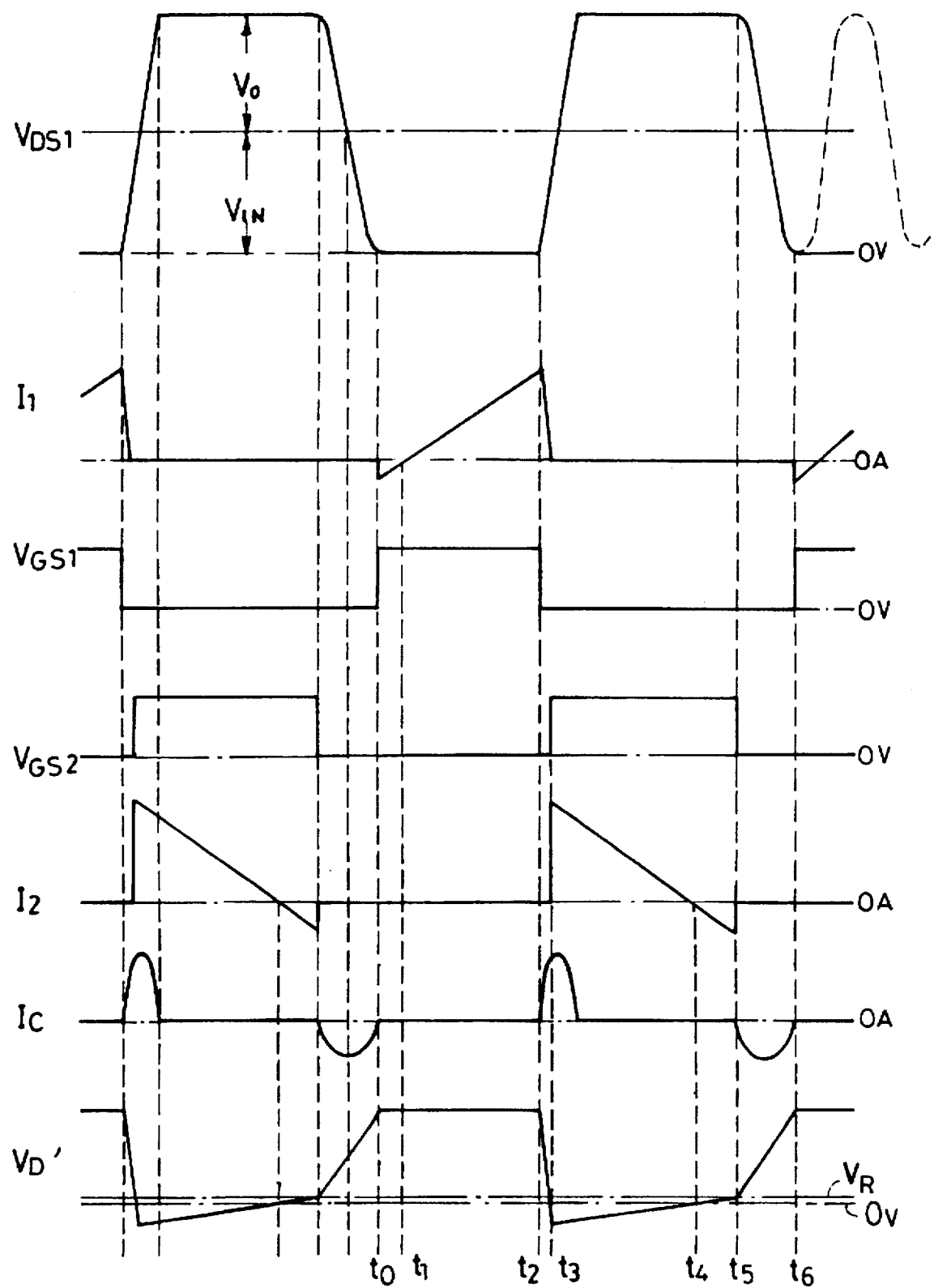
FIG. 4 is a diagram showing in proper time relationship the waveforms appearing in various parts of FIG. 1.

Reference is now directed to FIG. 4 for the discussion of the second FET 7. The symbols newly used in this waveform diagram are:

$I_1$=drain current of the first FET 3
$V_{GS2}$=gate-source voltage of the second FET 7
$I_2$=current of the transformer secondary 14
$I_C$=current of the resonant capacitor 5
$V_D'$=sum of the voltage $V_D$ of the rectifying diode 6 and the voltage of the reverse blocking diode 49.

If the energy due to the aforesaid energy reversal is left in the transformer 2 at $t_0$ in FIG. 4 when the conduction control of the first FET 3 is initiated, such residual energy will be released through the closed circuit comprising the transformer primary 13, the power supply 1 and the drain and source, or inbuilt diode 4, of the first FET 3. The current $I_1$ will therefore flow reversely during the $t_0$–$t_1$ period in FIG. 4. Thereafter the current $I_1$ will go positive and increase from $t_1$ to $t_2$.

The efficiency of the converter would be adversely affected if the reverse current component of the current $I_1$ from $t_0$ to $t_1$ were two great. This potential drawback is avoided according to the invention by optimally preadjusting the conducting period of the second FET 7. Such preadjustment can be done by varying the resistance offered by either the resistor 46 or 47.

The current $I_1$ will start decreasing toward zero, and the charge current $I_C$ for the resonant capacitor 5 will start flowing in the positive direction, when the gate-source voltage $V_{GS1}$ of the first FET 3 drops to zero at $t_2$. The transformer 2 will also start releasing its stored energy with the nonconduction of the first FET 5, and the current $I_2$ will start flowing through its secondary 14. The rectifying diode 6 will be conductive during the energy release from the transformer 2, so that both voltage $V_D$ of this diode and input voltage $V_D'$ of the comparator 50, FIG. 1, of the second switch control circuit 11 will start dropping at $t_2$. The gate-source voltage $V_{GS2}$ of the second FET 7 will go high at $t_3$ when the comparator input voltage $V_D'$ crosses the reference voltage $V_R$. Now the secondary current $I_2$ will flow not only through the rectifying diode 6 but through the second FET 7, too. The total resistance offered by the parallel circuit of diode 6 and FET 7 is less than that of the diode only, thereby reducing both voltage drop and power loss.

The secondary current $I_2$ will become zero, and the transformer secondary 14 will cease to provide the voltage for forwardly biasing the rectifying diode 6, when the transformer 2 completes the release of its forwardly stored energy at $t_4$. Although the diode 6 will then go off, the second FET 7 is held conductive until $t_5$, later than $t_4$, so that a closed circuit is provided which comprises the smoothing capacitor 8, transformer secondary 14 and second FET 7. Energy will then be reversed from capacitor 8 to transformer 2, resulting in the reverse flow of secondary current $I_2$ and hence in the storage of energy in the transformer in the opposite direction to that from $t_1$ to $t_2$.

The amount of energy reversed and stored in the transformer 2 as above depends upon the length of the $t_4$–$t_5$ period. This period may be so determined that the potential difference between the positive and the negative peaks of the voltage waveform of the LC resonance due to the inductance of the transformer primary 13 and the capacitance of the capacitor 5 may approximately equal the drain-source voltage $V_{DS1}$ of the first FET 3 during its nonconducting period.

If the first FET 3 were not turned at $t_5$ and if it had not inbuilt diode 4, the resulting resonant voltage waveform would be as indicated by the broken line after $t_5$ in FIG. 4. Were it not for the energy reversal from $t_4$ to $t_5$, the voltage amplitude of the LC resonance would not be sufficiently great to make the drain-source voltage $V_{DS1}$ of the first FET 3 zero at $t_6$ when this FET is turned on. No appreciable reduction of switching loss would therefore be obtainable as the FET 3 cannot be turned on at zero drain-source voltage.

In contrast, according to the present invention, the drain-source voltage $V_{DS1}$ can be made zero when the first FET 3 is turned on, realizing ideal reduction of switching loss. As an additional advantage, the conducting periods of the second FET 7 can be positively determined by simple circuit means.

Second Form

Figure 5:
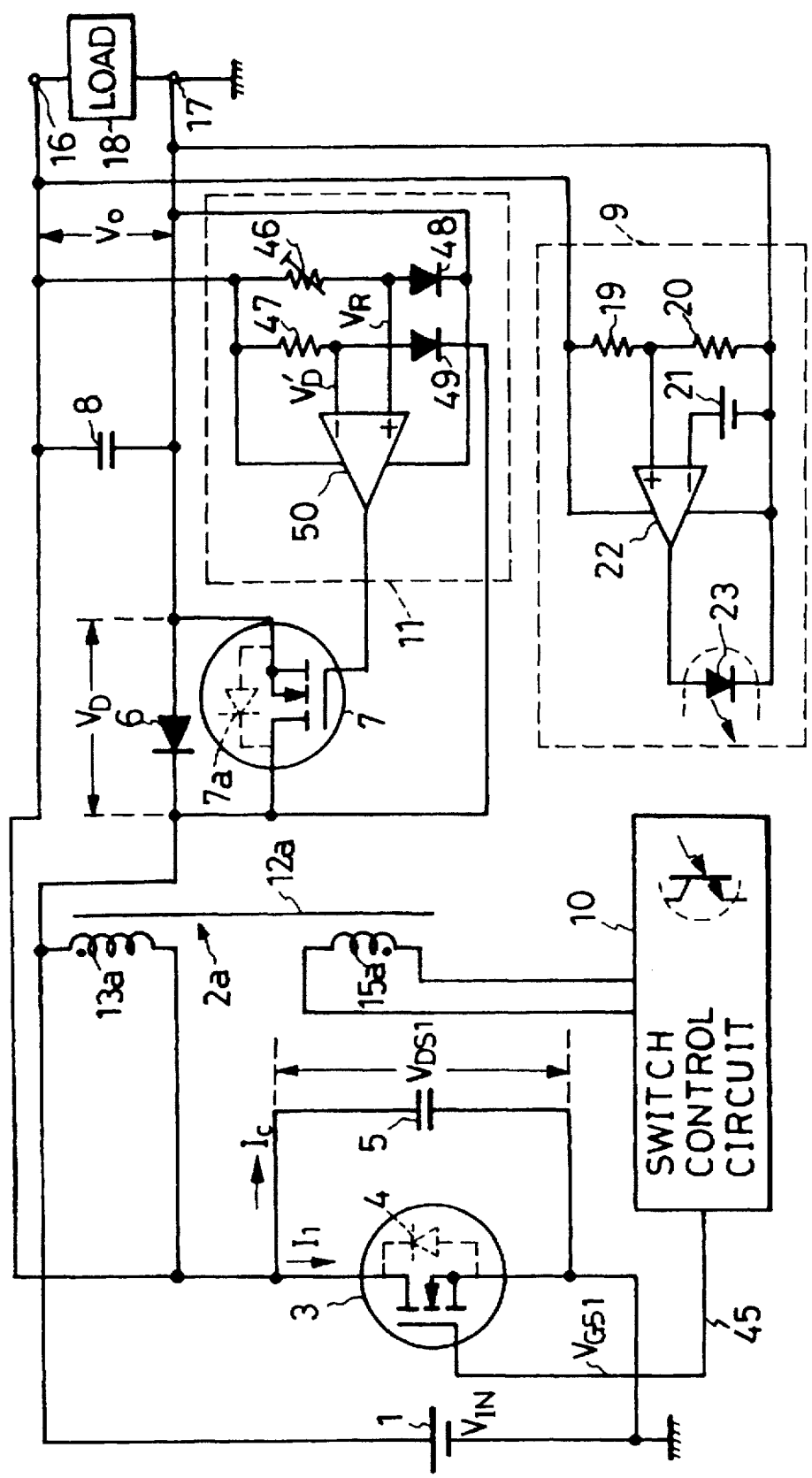
FIG. 5 is a schematic electrical diagram of a second preferred form of dc to dc converter according to the present invention.

In FIG. 5 is shown the second form of dc to dc converter according to the present invention which is similar in construction to the FIG. 1 device except for a reactor $2a$ employed as inductance means in place of the transformer 2 in FIG. 1. The reactor $2a$ comprises a magnetic core $12a$, a first winding $13a$ for voltage conversion, and a second winding $15a$ for the detection of the nonconducting period of the first FET 3. The two windings $13a$ and $15a$, corresponding respectively to the primary 13 and tertiary 15 of the transformer 2, are wound on the core $12a$ and so magnetically coupled to each other.

The first winding $13a$, which has inductance, is connected in series with the first FET 3. This first winding is meant to perform the functions of both transformer primary 13 and secondary 14 of the preceding embodiment, so that the smoothing capacitor 8 is connected in parallel therewith via the rectifying diode 6. Being intended for the determination of the moment the reactor $2a$ completes the release of its stored energy, the second winding $15a$ is connected to the first switch control circuit 10 of the FIG. 2 construction.

All the other parts of the FIG. 5 device are as set forth above with reference to FIGS. 1 and 2. Such parts are therefore identified by the same reference numerals as those used to denote the corresponding parts in FIG. 1.

Operation of Second Form

In operation, too, the reactor $2a$ is akin to the transformer 2. Energy is stored in the reactor during each conducting period of the first FET 3 when the rectifying diode 6 is reversely biased. The thus stored energy is released during each nonconducting period of the first FET 3 when the diode 6 is forwardly biased.

The second FET 2 is controlled by detecting the voltage of the rectifying diode 6 connected in parallel therewith, as in the FIG. 1 embodiment. The energy reversal following the nonconduction of the rectifying diode 6 upon complete discharge of the forwardly stored energy in the reactor $2a$ takes place in the closed circuit comprised of the smoothing capacitor 8, the first reactor winding $13a$, and the second FET 7. The other details of operation, as well as the advantages, of the FIG. 5 converter are as previously set forth in connection with the FIG. 1 converter.

Third Form

Figure 6:
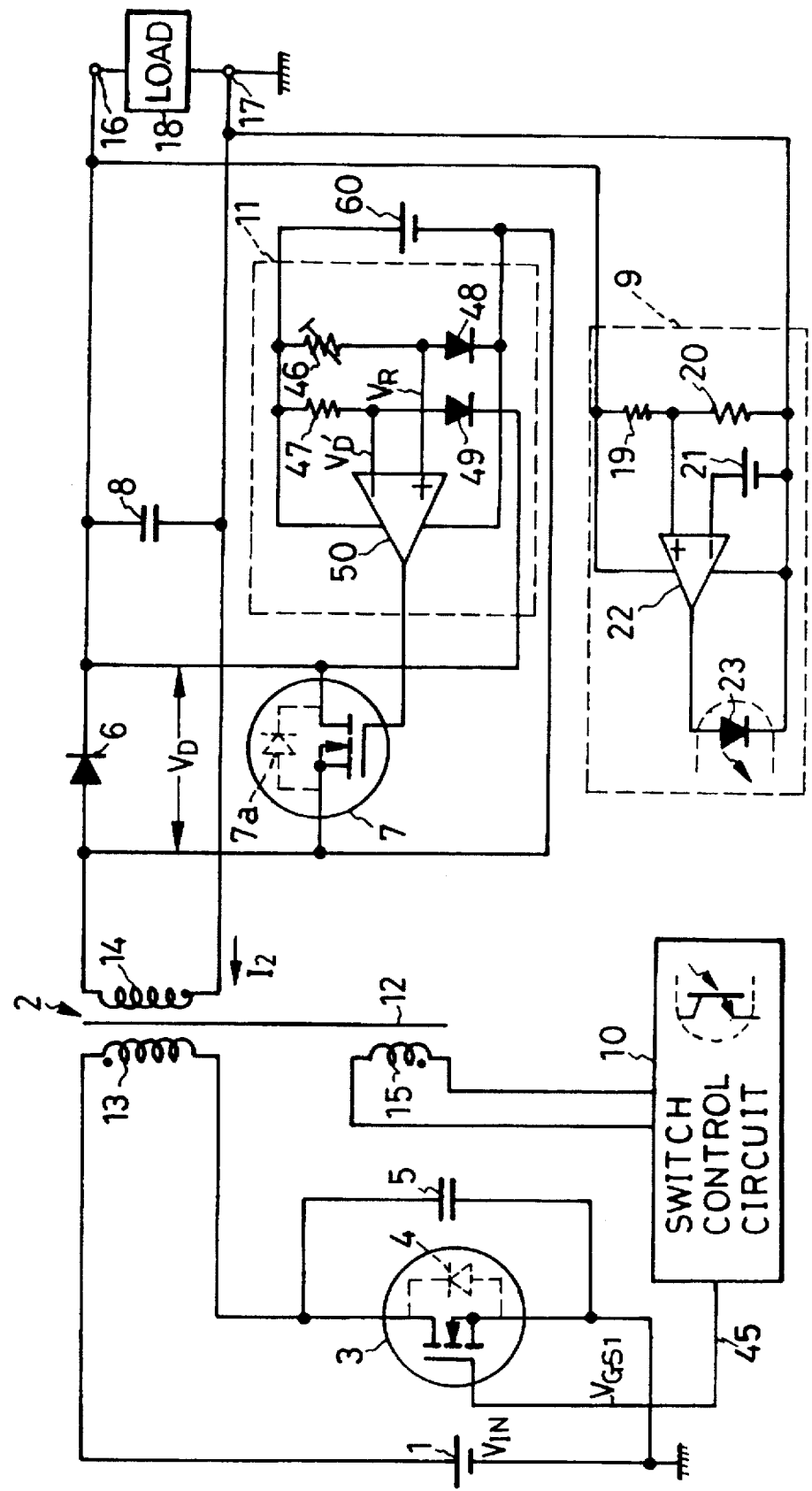
FIG. 6 is a schematic electrical diagram of a third preferred form of dc to dc converter according to the present invention.

FIG. 6 shows a third form of dc to dc converter according to the present invention which is similar to the FIG. 1 device except for the locations of the rectifying diode 6 and second FET 7 and for the additional provision of a control power supply 60. The rectifying diode 6 is connected between transformer secondary 14 and smoothing capacitor 8 but in a position opposite to that of the diode 6 in the FIG. 1 device, and the second FET 7 is connected in parallel therewith.

Since the smoothing capacitor 8 cannot be used as control power supply in this third embodiment, the separate power supply 60 is provided as a unidirectional voltage source. One terminal of the control power supply 60 is connected to the anode of the rectifying diode 6.

In the second switch control circuit 11 the serial circuit of first resistor 46 and first diode 48 is connected in parallel with the control power supply 60. The second resistor 47 is connected to the other terminal of the control power supply 60, and the second diode 49 is connected between the second resistor 47 and the cathode of the rectifying diode 6. The comparator 50 has its supply terminals connected to the control power supply 60.

The FIG. 6 device is essentially similar in construction to that of FIG. 1 except for the provision of the control power supply 6 for the second switch control circuit 11. Its manner of operation, and the advantages gained thereby, are therefore as previously set forth with reference to FIGS. 1–4.

Fourth Form

Figure 7:
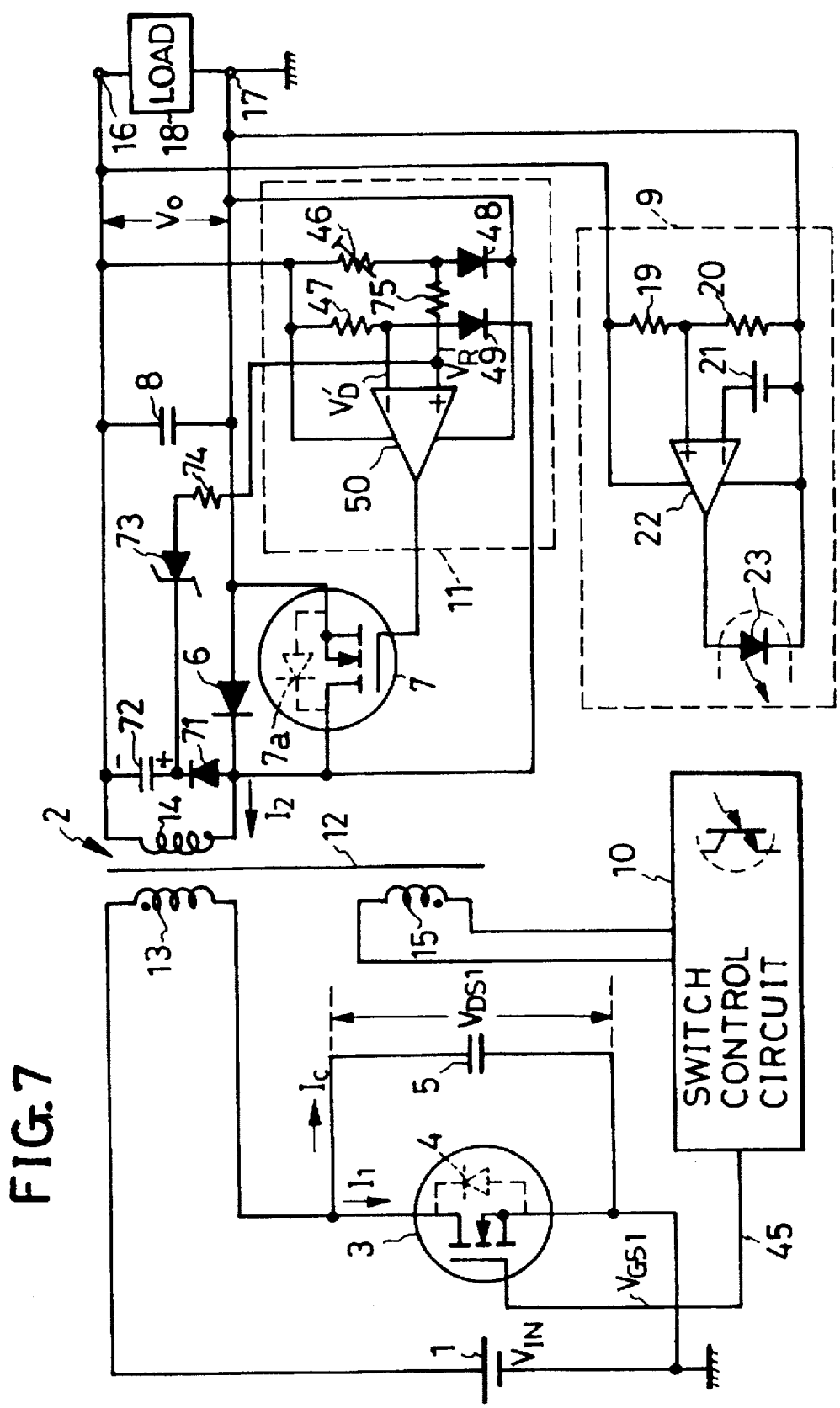
FIG. 7 is a schematic electrical diagram of a fourth preferred form of dc to dc converter according to the present invention.

The fourth form of dc to dc converter shown in FIG. 7 is so made as to assure optimal resonance in the face of fluctuations in supply voltage. Employed to this end are reference voltage adjustment means comprising a diode 71, capacitor 72, Zener diode 73, and resistors 74 and 75. All the other parts of the FIG. 7 converter are as previously explained with reference to FIGS. 1 and 2, so that only these additional means will be detailed.

The capacitor 72 is connected in parallel with the transformer secondary 14 via the diode 71. This diode 71 is so oriented as to become conductive by the voltage induced in the transformer secondary 14 during the conduction of the first FET 3, so that the capacitor 72 is charged during the conduction of the first FET to a voltage proportional to the supply voltage impressed to the transformer primary 13. The capacitor 72 is so much less in capacitance than the smoothing capacitor 8 that energy storage in the transformer 2 during the conduction of the first FET 3 is hardly interfered with.

The Zener diode 73 and the resistor 74 are interconnected in series between the positive input of the comparator 50 and the interconnection between diode 71 and capacitor 72. Forming an additional part of the second switch control circuit 11, the resistor 75 is connected between the positive input of the comparator 50 and the interconnection between resistor 46 and diode 48.

The Zener diode 73 will conduct in response to that voltage of the capacitor 72 which indicates that the supply voltage $V_{IN}$ is higher than the voltage induced in the transformer primary 13 due to the voltage (equal to the converter output voltage $V_O$) of the transformer primary 13 during the nonconduction of the first FET 3. The avalanche breakdown voltage or Zener voltage of the Zener diode 73 is so determined that this diode will conduct when the supply voltage $V_{IN}$ is greater than the maximum voltage $V_1$ ($V_{IN} > V_O$ in FIG. 3) of the transformer primary 13 during the nonconduction of the first FET 3.

Assume that the supply voltage $V_{IN}$ grows higher than the transformer primary voltage $V_1$ during the nonconduction of the first FET 3. Thereupon the Zener diode 73 will conduct in response to the corresponding voltage of the capacitor 72. A closed circuit will then be completed which comprises the smoothing capacitor 8, voltage detecting capacitor 72, Zener diode 73, resisters 74 and 75, and diode 48, resulting in the delivery of a voltage dependent upon the voltage of the capacitor 72 to the positive input of the comparator 50.

Consequently, during the conduction of the Zener diode 73, the reference voltage $V_R$ will vary with the supply voltage $V_{IN}$ and be higher than during the nonconduction of the Zener diode.

As will be apparent from comparison of $V_D'$ and $V_R$ in FIG. 4, the trailing edges of the output pulses of the comparator 50, or of the gate-source voltage pulses $V_{GS2}$ of the second FET 7 will lag behind with an increase in the reference voltage $V_R$. A longer period of time will therefore elapse from the moment the rectifying diode 7 goes off upon completion of energy release from the transformer 2 to the moment the second FET 7 goes off, so that energy reversal from smoothing capacitor 8 to transformer 2 will take place during the longer period of time. The amount of energy stored in the transformer 2 by the energy reversal is in proportion with the voltage amplitude of the LC resonance due to the inductance of the transformer primary 13 and the capacitance of the resonant capacitor 5. Therefore, as the supply voltage $V_{IN}$ rises, a greater amount of energy will be reversed and stored in the transformer 2, and LC resonance of greater voltage amplitude will result.

Figure 8:
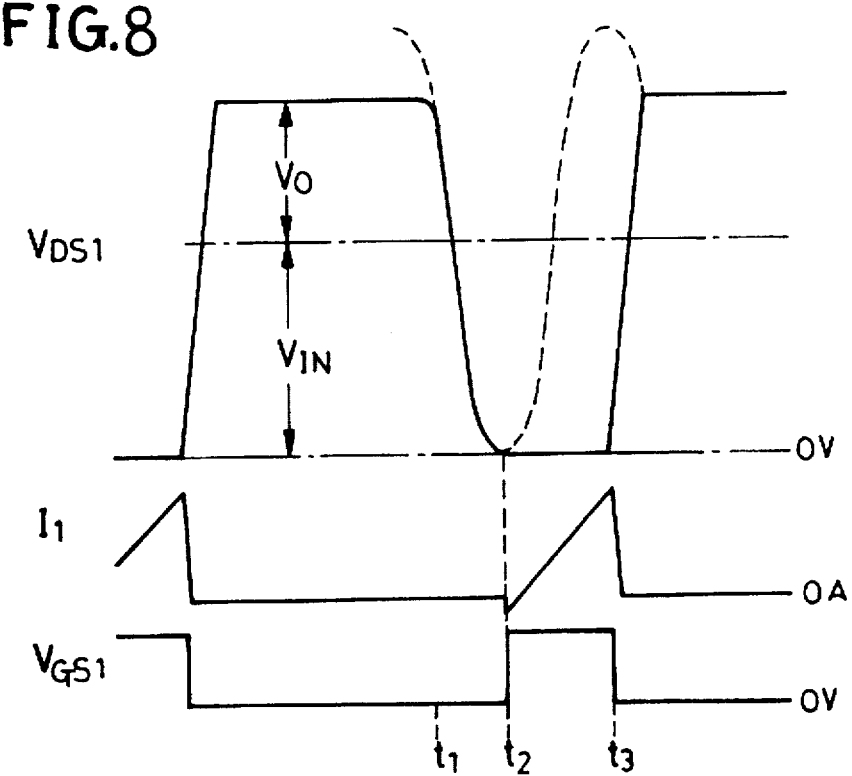
FIG. 8 is a diagram showing in proper time relationship the waveforms appearing in various parts of FIG. 7.
Figure 9:
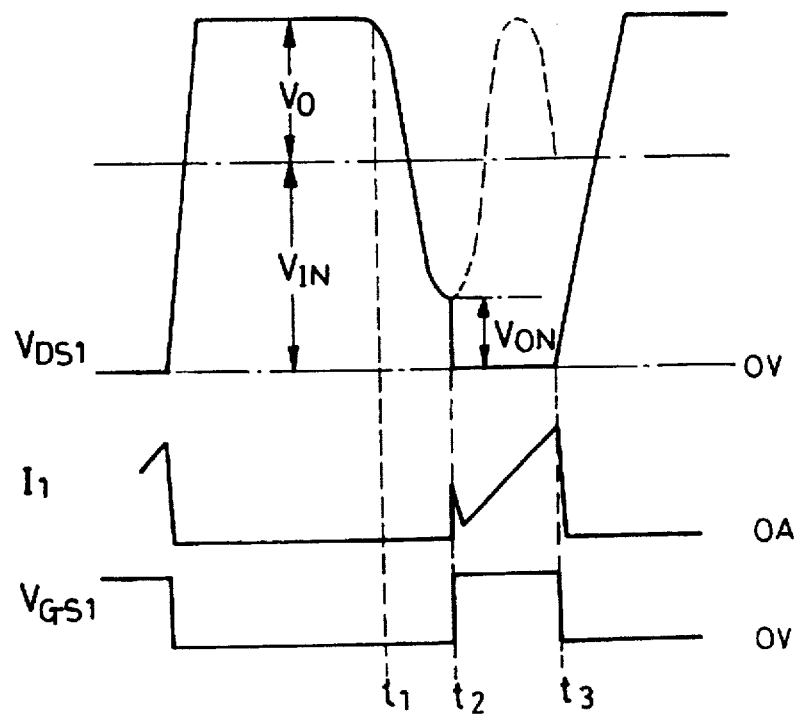
FIG. 9 is a waveform diagram explanatory of the operation of the FIG. 1 converter in the event of a rise in supply voltage.

FIG. 8 is explanatory of the relationship between the supply voltage $V_{IN}$ and the amplitude of the resonant voltage. The supply voltage $V_{IN}$ is here shown to be higher than in FIG. 4, and the resonant voltage amplitude to be proportionately greater from $t_1$ to $t_2$. If the resonant voltage amplitude were not made greater by the energy reversal, the drain-source voltage $V_{DS1}$ of the first FET 3 would not be made zero at $t_2$ when its gate-source voltage $V_{GS1}$ goes high, as illustrated in FIG. 9. The drain-source voltage $V_{DS1}$ would not become zero at $t_2$ if a charge were left on the resonant capacitor 5. This charge would be released through the first FET 3 upon its conduction at $t_2$, and the current $I_1$ of the first FET would flow like a pulse just after $t_2$, resulting in power loss at the first FET. No such current is shown to flow in FIG. 8, so that little or no power loss will take place when the first FET is switched on.

Fifth Form

Figure 10:
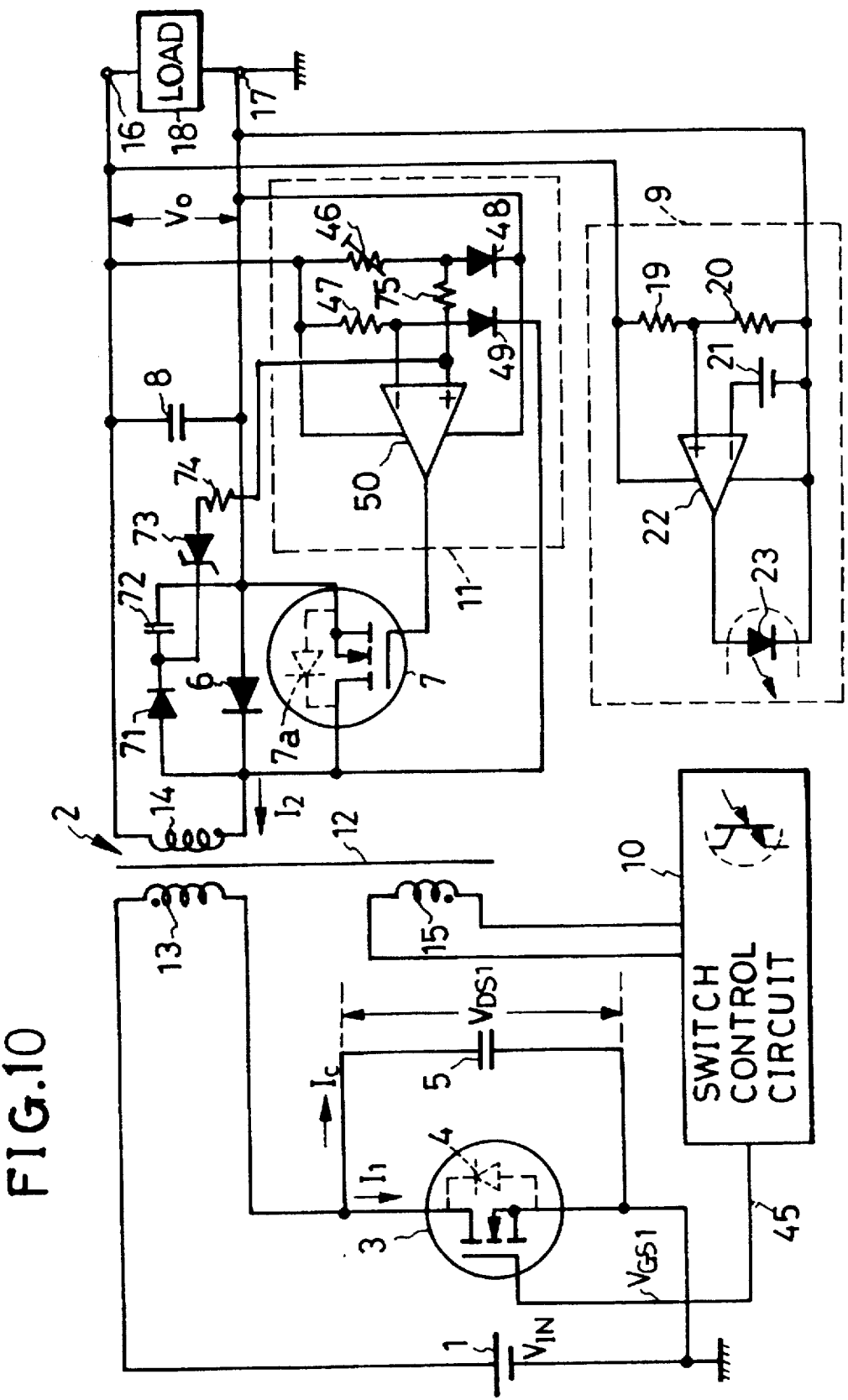
FIG. 10 is a schematic electrical diagram of a fifth preferred form of dc to dc converter according to the present invention.

The fifth form of dc to dc converter shown in FIG. 10 is akin to the FIG. 7 converter except that the serial circuit of diode 71 and capacitor 72 is connected in parallel with the rectifying diode 6. Also as in the FIG. 7 device the diode 71 is so oriented as to conduct when a voltage is induced downwardly in the transformer secondary 14. The capacitor 72, which is less in capacitance than the smoothing capacitor 8, is charged to a voltage corresponding to the voltage of the transformer secondary 14 during the conduction of the first FET 3, that is, the supply voltage $V_{IN}$. Also as in the preceding embodiment, the avalanche breakdown voltage of the Zener diode 73 is so determined that it may conduct when $V_{IN}$ is greater than $V_1$. The other constructional and operational details are as set forth above in connection with the FIG. 7 device.

Sixth Form

Figure 11:
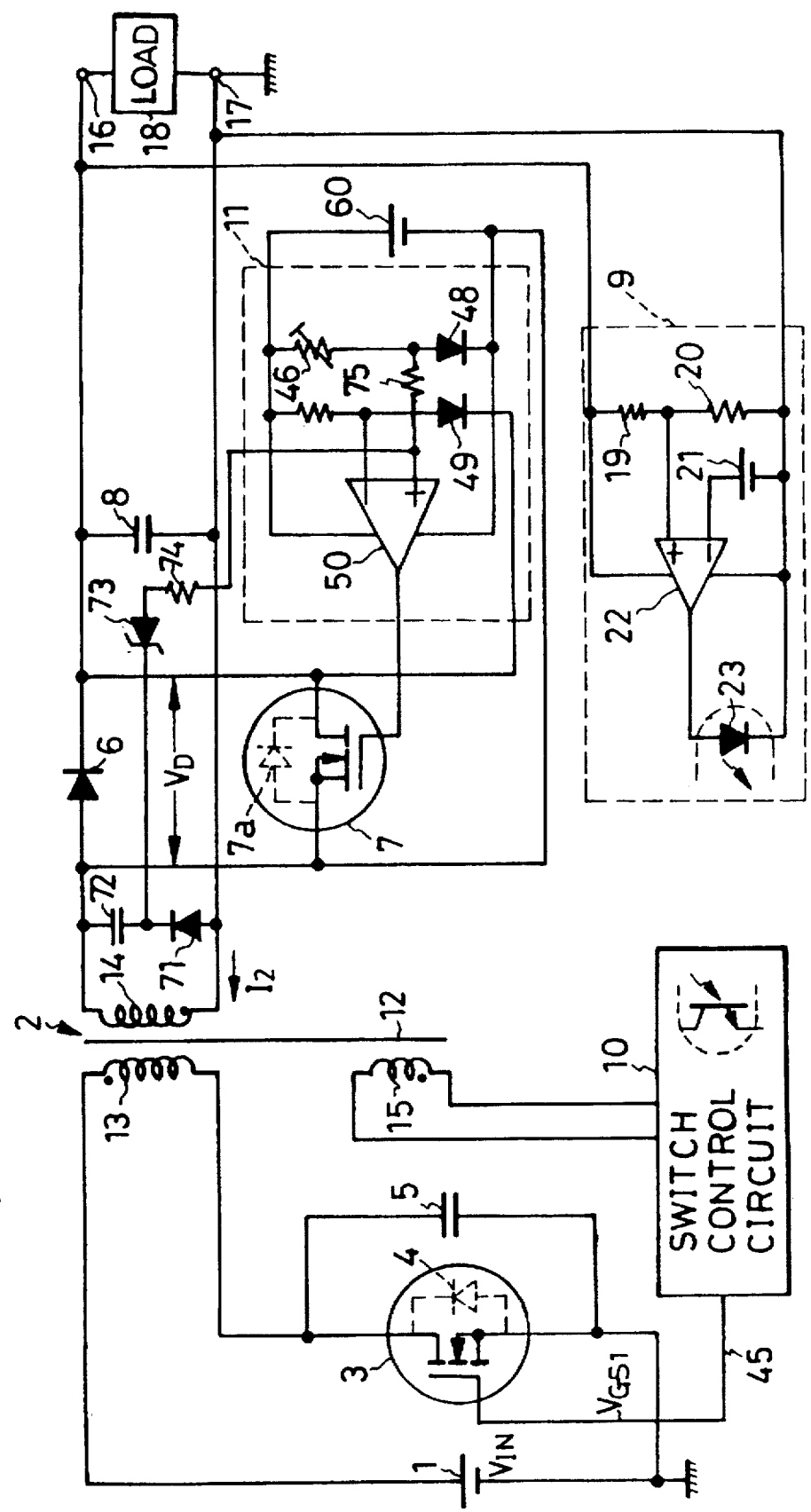
FIG. 11 is a schematic electrical diagram of a sixth preferred form of dc to dc converter according to the present invention.

The sixth form of dc to dc converter shown in FIG. 11 may be considered a combination of the FIG. 6 converter and that of FIG. 7 in that the reference voltage adjustment means of FIG. 7 are added to the FIG. 6 device. Such adjustment means comprise the diode 71, capacitor 72, Zener diode 73, and resistors 74 and 75, which are connected to the transformer secondary 14 and the second switch control circuit 11 just like their counterparts in FIG. 7. The other constructional and operational details are as set forth above with reference to FIGS. 6 and 7.

Seventh Form

Figure 12:
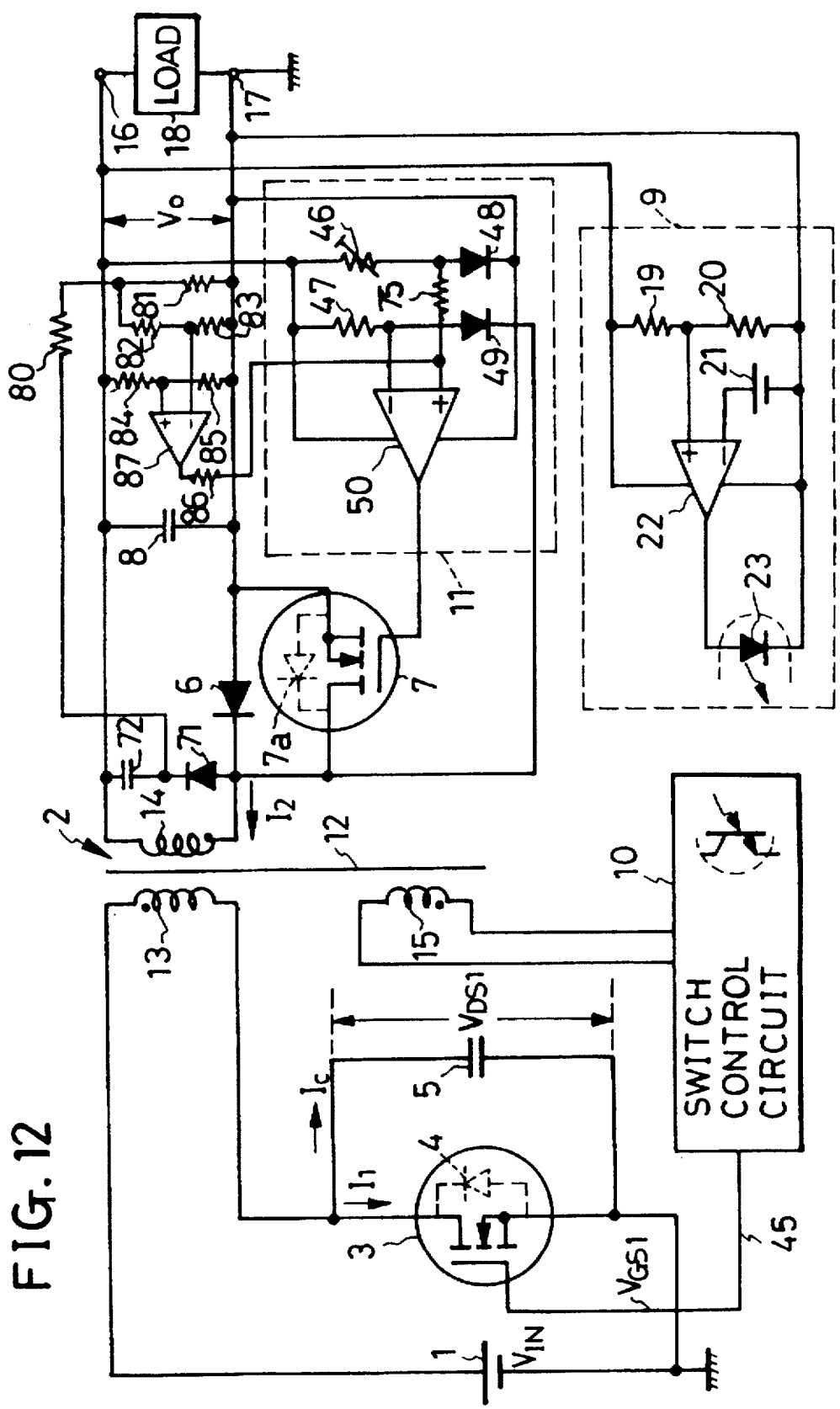
FIG. 12 is a schematic electrical diagram of a seventh preferred form of dc to dc converter according to the present invention.

FIG. 12 shows a seventh form of dc to dc converter according to the invention which is similar to the FIG. 7 embodiment except for the absence of the Zener diode 73 and resistor 74 and for the addition of resistors 80–86 and operational amplifier 87. The resistor 80 is connected on one hand to the interconnection between diode 71 and capacitor 72 which, as in the FIG. 7 device, are connected in parallel with the transformer secondary 14. The resistor 80 is connected on the other hand to the resistor 81 and thence to the capacitor 8 or to the grounded converter output terminal 17. The resistors 82 and 83 are connected in series with each other and in parallel with the resistor 81. The resistors 84 and 85 are likewise connected in series with each other and in parallel with the smoothing capacitor 8.

The operational amplifier 87 has a positive input connected to the interconnection between the resistors 84 and 85, and a negative input to the interconnection between the resistors 82 and 83. The output of the operational amplifier is connected to the positive input of the comparator 50 of the second switch control circuit 11 via the resistor 86.

The FIG. 12 converter is the same in all the other details of construction with that of FIG. 7.

Operation of Seventh Form

Operationally, the FIG. 12 converter differs from that of FIG. 7 in that the conducting periods of the second FET 7 and the periods of energy reversal are determined in consideration of both supply voltage $V_{IN}$ and output voltage $V_O$. The amount of energy stored in the transformer 2 by energy reversal will lessen in the FIG. 7 device when the output voltage $V_O$ drops below the desired value, as in the event of the operation of overcurrent protection. A resonant voltage of sufficient amplitude will not be obtained in that case, with the possible result that the drain-source voltage $V_{DS1}$ of the first FET 3 does not become zero at $t_2$ in FIG. 9 when the first FET conducts.

The FIG. 12 converter overcomes this potential drawback. Toward this end the sum of the voltage $V_O$ of the smoothing capacitor 8 and that of the supply voltage detecting capacitor 72 is detected by the voltage dividing circuit of the resistors 80 and 81, and the sum voltage is divided by the resistors 82 and 83 for delivery to one input of the operational amplifier 87. To the other input of this operational amplifier is supplied the voltage obtained by dividing the voltage of the smoothing capacitor 8 by the resistors 84 and 85. The resulting output from the operational amplifier 87 is delivered to the comparator 50.

The voltage dividing ratios of the resistors 80–83 and the resistors 84 and 85 differ, so that the divisions of the converter output voltage $V_O$, supplied as above to both inputs of the operational amplifier 87, are not to cancel each other. The output from the operational amplifier 87 may therefore be considered essentially representative of the difference between supply voltage $V_{IN}$ and output voltage $V_O$.

The output voltage of the operational amplifier 87 will rise in event the output voltage $V_O$ falls below the desired value. This rise in the voltage supplied to the positive input of the comparator 50 will increase the durations of its output pulses and, therefore, the periods of energy reversal such as the $t_3$–$t_4$ period in FIG. 3. A required amount of energy can thus be reversed and stored in the transformer 2 despite the drop in the output voltage $V_O$.

As a result, in this FIG. 12 converter, the LC resonance circuit composed of the inductance of the transformer primary 13 and the capacitance of the capacitor 5 can provide a resonant voltage of desired amplitude despite fluctuations in supply voltage $V_{IN}$ and output voltage $V_O$. The voltage of the resonant capacitor 5, or the drain-source voltage $V_{DS1}$ of the first FET 3, can be made zero when the first FET is turned on.

Eighth Form

Figure 13:
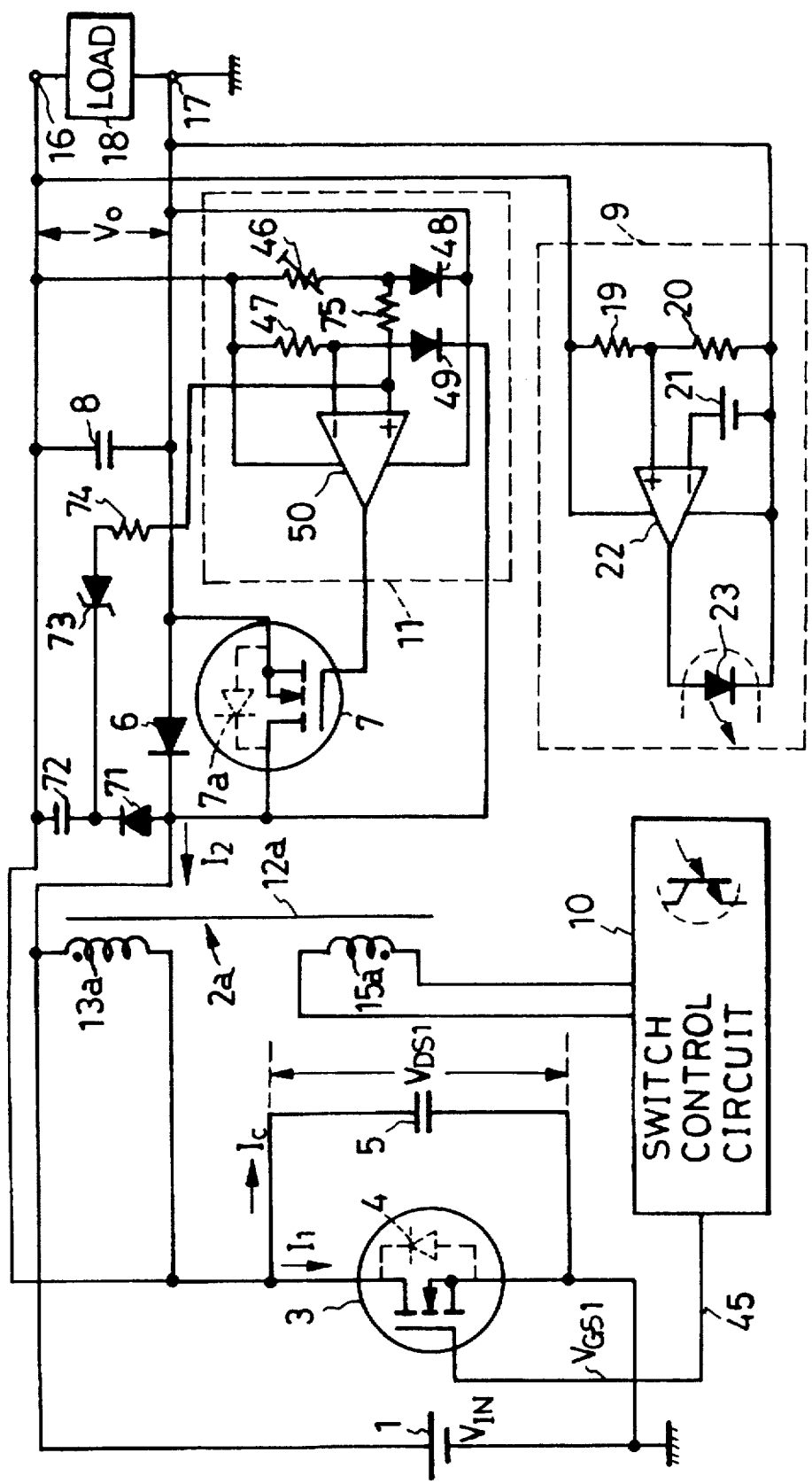
FIG. 13 is a schematic electrical diagram of an eighth preferred form of dc to dc converter according to the present invention.

In FIG. 13 is shown a combination of the FIGS. 5 and 7 converters; that is, the reference voltage adjustment means of FIG. 7 are added to the FIG. 5 device. Such adjustment means include the serial circuit of diode 71 and capacitor 72 which is connected in parallel with the transformer primary 13a, instead of with the transformer secondary 14 as in FIG. 17. The other parts of the reference voltage adjustment means, the Zener diode 73 and resistors 74 and 75, are connected just like their counterparts in FIG. 7.

As the supply voltage $V_{IN}$ is impressed to the transformer primary 13a during the conduction of the first FET 3, the capacitor 72 will be charged to a voltage equal to the supply voltage. The FIG. 13 converter thus gains the same advantages as does the FIG. 7 device.

Possible Modifications

Although the present invention has been shown and described herein before as embodied in the several specific forms, it is not desired that the invention be limited by the exact details of such disclosure. The following, then, is a brief list of possible modifications or alterations of the illustrated embodiment which are all believed to fall within the scope of the invention:

1. In the FIG. 13 converter the serial circuit of diode 71 and capacitor 72 could be connected in parallel with the rectifying diode 6 as in FIG. 10.

2. In both FIGS. 5 and 13 converters the parallel circuit of rectifying diode 6 and second FET 7 could be connected between the other extremity of the transformer primary 13a and the other terminal of the smoothing capacitor 8.

3. The FIG. 5 converter could be provided with the reference voltage adjustment means comprising the diode 71, capacitor 72, resistors 80–86, and operational amplifier 87, as in FIG. 12.

4. The FIG. 11 converter could also be provided with the reference voltage adjustment means of FIG. 12.

5. Not only in the FIG. 1 converter but also in those of FIGS. 5–7 and 10–13 the diode 48 could be replaced by a resistor.

6. The first FET 3 could be replaced by a parallel connection of a semiconductor switch such as a bipolar transistor and a diode, and the second FET 7 by a semiconductor switch, in all the illustrated embodiments.

7. The rectifying diode 6 could be omitted, and the inbuilt diode of the second FET 7 could be used for output rectification, in all the illustrated embodiment.

8. The first switch control circuit, FIG. 2, permits a variety of modifications; for example, the desired delay could be obtained by the carrier storage action of the transistor 34, rather than by the capacitor 33, and the comparator circuit 40 could be replaced by a NOT circuit having a threshold value.

9. An amplifier could be provided on the output side of the comparator 50 of the second switch control circuit 11.

10. A capacitor could be connected in parallel with the second FET 7 with a view to the reduction of switching loss and to noise suppression.

What is claimed is:

1. A dc to dc converter for converting one direct current voltage into another preparatory to delivery to a load, the converter comprising:

(a) a source of a direct current voltage;

(b) a first switching element connected across the voltage source for turning the same on and off, the first switching element having a control terminal;

(c) inductance means connected in series with the first switching element for storing energy from the voltage source during conduction of the first switching element and for releasing the stored energy during nonconduction of the first switching element;

(d) a rectifying diode connected to the inductance means so as to be reversely biased by a voltage from the inductance means during conduction of the first switching element and forwardly biased by a voltage from the inductance means during nonconduction of the first switching element;

(e) a smoothing capacitor connected to the inductance means via the rectifying diode for smoothing a voltage that has been recalled by the rectifying diode, for supply to a load;

(f) first switch control means connected to the control terminal of the first switching element for on off control of the first switching element;

(g) a second switching element connected in parallel with the rectifying diode, the second switching element having a control a terminal; and (h) second switch control means comprising:
  (i) diode voltage detecting means connected to the rectifying diode for detecting the voltage thereof;
  (ii) reference voltage means for providing a reference voltage; and
  (iii) comparison means connected to the diode voltage detecting means and the reference voltage means and to the control terminal of the second switching element for comparing the voltage of the rectifying diode and for causing conduction through the second switching element when the voltage of the rectifying diode is less than the reference voltage.

2. The dc to dc converter of claim 1 wherein the inductance means comprises a transformer.

3. The dc to dc converter of claim 2 wherein the transformer has a primary winding connected to the first switching element, and a secondary winding connected to the rectifying diode.

4. The dc to dc converter of claim 3 wherein the transformer has a tertiary winding connected to the first switch control means.

5. The dc to dc converter of claim 4 wherein the inductance means comprises a reactor.

6. The dc to dc converter of claim 5 wherein the smoothing capacitor is connected in parallel with the reactor via the rectifying diode.

7. The dc to dc converter of claim 1 further comprising a resonant capacitor connected in parallel with the first switching element and coacting with the inductance means for resonance with a frequency higher than a rate at which the first switching element is turned on and off.

8. The dc to dc converter of claim 7 which further comprises output voltage detecting means for detecting the output voltage of the smoothing capacitor, and wherein the first switch control means comprises:
  (a) first circuit means connected to the inductance means for detecting a first moment when substantially all the energy that has been stored in the inductance means is released, and a second moment spaced from the first moment by a period of time equal to 180 electrical degrees of a voltage wave-form created by the resonance;
  (b) second circuit means coupled to the output voltage detecting means for determining, in response to the detected output voltage, a third moment when the first switching element is to be made nonconductive in order to make the output voltage constant; and
  (c) third circuit means connected to the first and the second circuit means and to the control terminal of the first switching element for causing conduction through the first switching element from the second to the third moment.

9. The dc to dc converter of claim 1 wherein the reference voltage means of the second switch control means comprises a serial circuit of a first resistor and a first diode, the serial circuit being connected in parallel with the smoothing capacitor, wherein the diode voltage detecting means of the second switch control means comprises a second resistor connected to the smoothing capacitor, and a second diode connected between the second resistor and the connection between the inductance means and the rectifying diode, and wherein the comparison means of the second switch control means comprises a voltage comparator having a first input connected to the connection between the first resistor and the first diode, a second input connected to the connection between the second resistor and the second diode, and an output connected to the control terminal of the second switching element.

10. The dc to dc converter of claim 1 further comprising a second source of a direct current voltage for control purposes, the second voltage source being connected to the rectifying diode and to the second switch control means.

11. The dc to dc converter of claim 10 wherein the reference voltage means of the second switch control means comprises a serial circuit of a first resistor and a first diode, the serial circuit being connected across the second voltage source, wherein the diode voltage detecting means of the second switch control means comprises a second resistor connected to the second voltage source, and a second diode connected between the second resistor and the rectifying diode, and wherein the comparison means of the second switch control means comprises a voltage comparator having a first input connected to the connection between the first resistor and the first diode, a second input connected to the connection between the second resistor and the second diode, and an output connected to the control terminal of the second switching element.

12. The dc to dc converter of claim 1 further comprising means for adjustably varying the reference voltage applied from the reference voltage means of the second switch control means to the comparison means thereof.

13. The dc to dc converter of claim 12 wherein the adjustably varying means comprises:
  (a) a diode;
  (b) a voltage detecting capacitor connected in parallel with the inductance means via the diode;
  (c) a resistor;
  (d) a Zener diode connected via the resistor between the comparison means of the second switch control means and the connection between the diode and the voltage detecting capacitor; and
  (e) another resistor connected between the reference voltage means of the second switch control means and the comparison means thereof.

14. The dc to dc converter of claim 12 wherein the adjustably varying means comprises:
  (a) a diode;
  (b) a voltage detecting capacitor connected in parallel with the rectifying diode via the diode;
  (c) a first resistor;
  (d) a Zener diode connected via the first resistor between the comparison means of the second switch control means and the connection between the diode and the voltage detecting capacitor; and
  (e) a second resistor connected between the reference voltage means of the second switch control means and the comparison means thereof.

15. The dc to dc converter of claim 12 wherein the adjustably varying means comprises:
  (a) a diode;
  (b) a voltage detecting capacitor connected in parallel with the inductance means via the diode;
  (c) a first resistor;
  (d) a second resistor connected via the first resistor to the connection between the diode and the voltage detecting capacitor on one hand and, on the other hand, to the smoothing capacitor;
  (e) a third and a fourth resistor connected in series with each other and in parallel with the second resistor;

(f) a fifth and a sixth resistor connected in series with each other and in parallel with the smoothing capacitor;

(g) a seventh resistor; and (h) an operational amplifier having a first input connected to the connection between the third and the fourth resistor, a second input connected to the connection between the fifth and the sixth resistor, and an output connected via the seventh resistor to the comparison means of the second switch control means.

16. The dc to dc converter of claim 1 wherein the first switching element is an insulated gate field effect transistor having an inbuilt diode connected between a drain and a source thereof.

17. The dc to dc converter of claim 1 wherein the second switching element is an insulated gate field effect transistor.

18. The dc to dc converter of claim 16 wherein the field effect transistor has an inbuilt diode.

* * * * *